United States Patent [19]
Kita

[11] Patent Number: 4,779,417
[45] Date of Patent: Oct. 25, 1988

[54] HYDRAULIC PRESSURE SYSTEM
[75] Inventor: Yasuo Kita, Kyoto, Japan
[73] Assignee: Shimadzu Corporation, Sanjo Factory, Kyoto, Japan
[21] Appl. No.: 58,372
[22] Filed: Jun. 5, 1987
[30] Foreign Application Priority Data Jun. 11, 1986 [JP] Japan .................. 61-136969

[51] Int. Cl.⁴ .......................... F16D 31/02
[52] U.S. Cl. ....................... 60/430; 60/464; 60/486; 60/488; 60/492
[58] Field of Search .............. 60/488, 492, 464, 486, 60/428, 430, 487, 489, 490, 491

[56] References Cited
U.S. PATENT DOCUMENTS

| | | | |
|---|---|---|---|
| 3,186,162 | 6/1965 | Pignolet et al. | 60/431 |
| 3,579,979 | 5/1971 | Bosch et al. | 60/491 X |
| 3,747,350 | 7/1973 | West et al. | 91/461 |
| 3,846,982 | 11/1974 | Rometsch et al. | 60/488 X |
| 4,149,380 | 4/1979 | Nonnenmacher | 60/464 X |
| 4,548,036 | 10/1985 | Matsuda et al. | 60/464 |

FOREIGN PATENT DOCUMENTS 568754 11/1977 U.S.S.R. .................. 60/464

Primary Examiner—Edward K. Look
Attorney, Agent, or Firm—Franklin D. Wolffe; Morris Fidelman

[57] ABSTRACT

A hydraulic pressure system comprising a hydraulic pump, a hydraulic motor, a pair of main hydraulic pressure lines connecting the pump and the motor so as to form a closed loop or circuit, a booster line for supplying a hydraulic pressure from a booster pump to the low pressure side of the closed circuit, a pilot line for taking out a pilot pressure from the high pressure side of the circuit to operate an actuator for controlling the hydraulic pump and the hydraulic motor, and a boost pressure regulator for causing the pressure in the booster line to rise only when the differential pressure between the two main hydraulic pressure lines of the closed circuit becomes lower than a predetermined level.

4 Claims, 4 Drawing Sheets

HYDRAULIC PRESSURE SYSTEM

BACKGROUND OF THE INVENTION

This invention relates to a hydraulic pressure system suitable for use in a transmission such as a hydrostatic transmission commonly referred to as an HST and a hydromechanical transmission commonly referred to as an HMT and various other hydraulic machines and instruments.

Generally, the hydraulic system adopted in the abovementioned HST or HMT comprises a hydraulic pump at the input side of the system, a hydraulic motor at the output side thereof, and a pair of main hydraulic pressure lines connecting the pump and the motor in such a manner as to form a closed loop or circuit, with the pump and the motor being of a variable displacement type so that the transmission ratio is continuously variable.

In many such systems, displacement of the hydraulic pump or motor is controlled through a pilot system, wherein there is provided a servo mechanism having a hydraulic actuator to change the angle of the swash plate or the eccentricity of the cylinder barrel of the hydraulic pump or motor, with a separate auxiliary pump being additionally provided to supply the actuator with an operating hydraulic pressure. Provision of the auxiliary pump, however, poses a problem that the number of the component parts of the apparatus increases with resulting complication of the structure thereof.

To avoid the problem a shuttle valve may be provided between the previously mentioned pair of main hydraulic pressure lines to use the hydraulic pressure taken out from the higher pressure side of the circuit as a pilot pressure for controlling the displacement of the above-mentioned pump without using any auxiliary pump.

In hydraulic pressure systems of this type used as a transmission, however, at the neutral position or a position adjacent thereto the pressure in the above-mentioned two main hydraulic pressure lines is lowered to a boost pressure, so that under normal condition it becomes impossible to operate the actuator for controlling the variable displacement of the pump and the motor. In hydraulic pressure systems of this type, in order to prevent cavitation from occurring at the inlet side of the hydraulic pump, the hydraulic pressure produced by a booster pump is supplied through a booster circuit to the lower pressure side of the main hydraulic pressure circuit. The boost pressure is usually set to a level lower than 5 kg/cm$^2$ if it is cavitation only that is to be prevented.

On the other hand, a pressure over 20 kg/cm$^2$ is usually required for controlling the variable displacement of the hydraulic pump and the hydraulic motor. If the boost pressure is set to a level high enough to enable the above-mentioned control, the booster pump will consume an unnecessarily large amount of energy in the normal driving condition in which the pressure in either one of the previously mentioned main hydraulic pressure lines becomes high, that is, in the condition in which it is not necessary to use the boost pressure to operate the actuator for controlling the variable displacement of the hydraulic pump and the motor. This is a great loss of energy.

The object of the present invention is to solve the above problem once and for all.

SUMMARY OF THE INVENTION

The object of the invention is attained by changing the boost pressure in accordance with the differential pressure between the two main hydraulic pressure lines.

Briefly stated, the hydraulic pressure system of the invention comprises a hydraulic pump, a hydraulic motor, a pair of main hydraulic pressure lines connecting the pump and the motor so as to form a closed loop or circuit, a booster line for supplying a hydraulic pressure from a booster pump to the low pressure side of the main hydraulic pressure circuit, a pilot line for taking out a pilot pressure from the high pressure side of the main hydraulic pressure circuit to operate an actuator for controlling the hydraulic pump and the hydraulic motor, and a boost pressure regulator for causing the pressure in the booster line to rise only when the differential pressure between the two main hydraulic pressure lines becomes lower than a predetermined level.

While the pressure in either one of the two main hydraulic pressure lines is higher than the other so that the differential pressure between the two main hydraulic pressure lines exceeds a preset level, a pilot pressure is taken out of that one of the main hydraulic pressure lines which has the higher pressure so that the actuator for controlling the variable displacement of the pump and the motor is operated with the pilot pressure, with the boost pressure being kept at a predetermined low level.

On the other hand, when the differential pressure between the two main hydraulic pressure lines becomes lower than the preset level, the boost pressure regulator operates to raise the boost pressure, so that the actuator is operated with the system pressure kept at the level of, or higher than, the boost pressure serving as a pilot pressure.

Thus, it is possible to keep the actuator operative at all times without providing an auxiliary pump and unnecessarily increasing the energy consumption of the booster pump.

DESCRIPTION OF THE PREFERRED EMBODIMENTS

Figure 1:
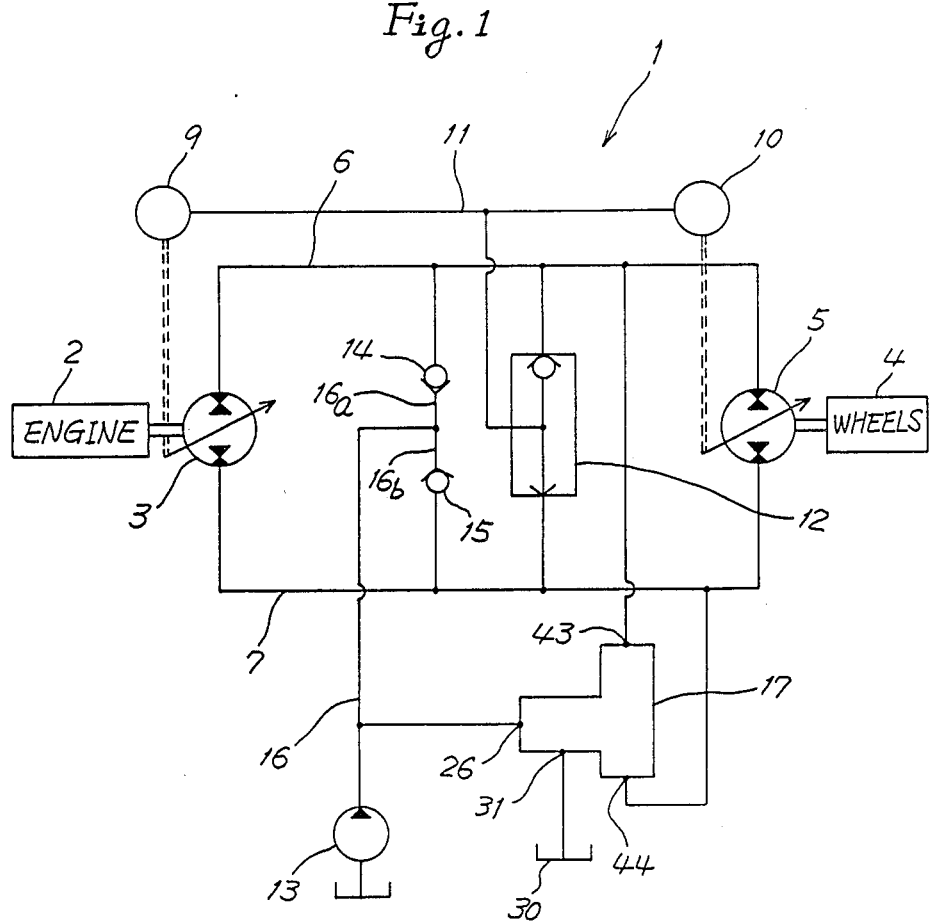
FIG. 1 is a schematic block diagram of one embodiment of the invention.

There is schematically shown in FIG. 1 a hydraulic pressure system 1 as applied to a transmission of an automobile such as an HST or HMT.

The system 1 comprises a hydraulic pump 3 driven by an engine 2, a hydraulic motor 5 for driving the wheels of an automobile shown as a single block 4, and a pair of main hydraulic pressure lines 6 and 7 connecting the pump 3 and the motor 5 into a closed loop or circuit. In the following description and claims the two lines 6 and 7 will be referred to collectively as the main (hydraulic pressure) circuit except when it is necessary to refer to them individually. The pump 3 and the motor 5 are both of a variable displacement type such that the displacements of the pump 3 and the motor 5 can be continuously changed by the operation of actuators 9 and 10, respectively. The actuators 9 and 10 are connected to the main hydraulic pressure circuit through a pilot line 11. In particular, the pilot line 11 is connected to the main hydraulic pressure lines 6 and 7 through a shuttle valve 12 in such a manner that the hydraulic pressure in that one of the two lines 6 and 7 which has a higher pressure may be supplied through the pilot line 11 to the actuators 9 and 10 as a driving power.

In order to prevent cavitation from occurring at the inlet side of the pump 3, a booster pump 13 is connected through a booster line 16 to the two main hydraulic pressure lines 6 and 7. The circuit 16 has two branches 16a and 16b connected to the main lines 6 and 7 through check valves 14 and 15, respectively, so that the hydraulic pressure produced by the pump 13 may be supplied to the main lines.

A boost pressure regulator 17 is connected to the booster line 16 so as to change the pressure in the line 16. The regulator 17 is so designed as to raise the pressure in the line 16 up to a predetermined level only when the differential pressure between the two main hydraulic pressure lines 6 and 7 drops below a preset level, say, 15 kg/cm².

Figure 2:
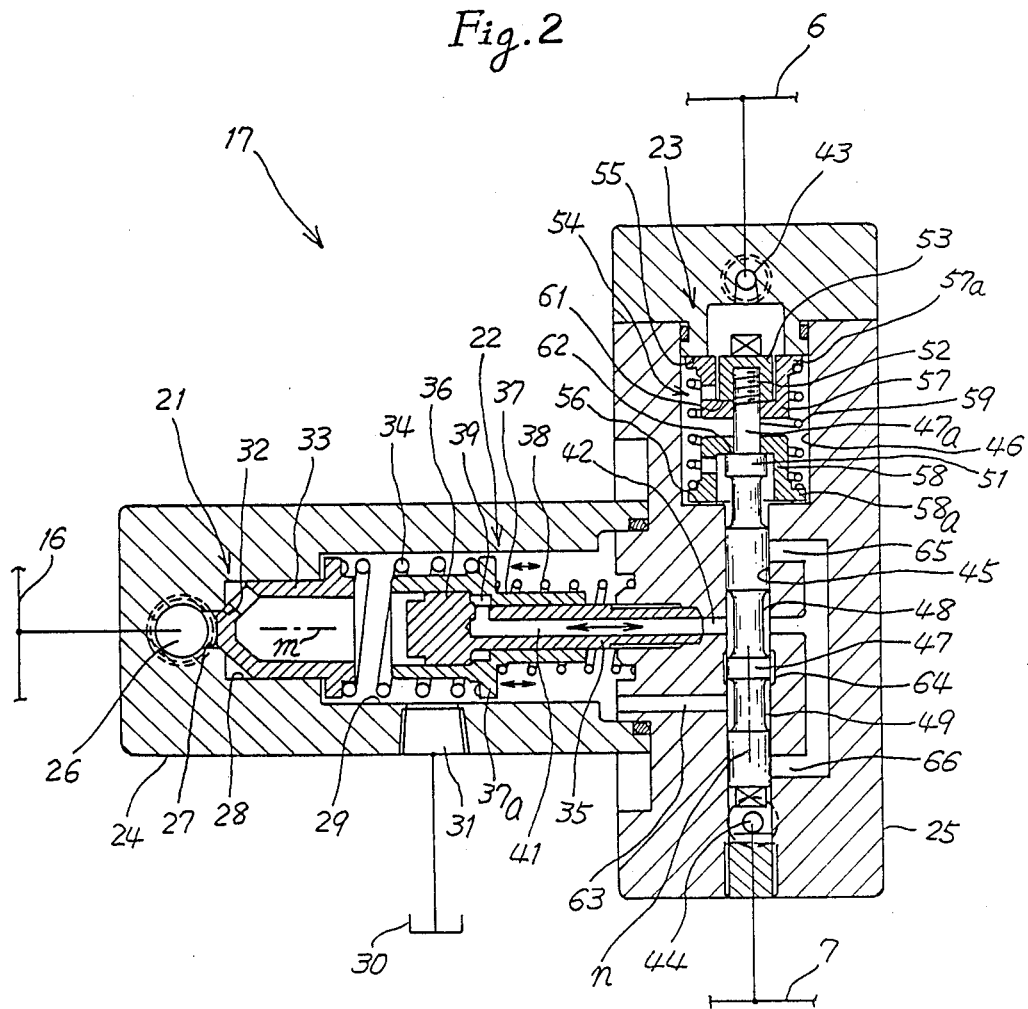
FIG. 2 is a sectional view of one form of the boost pressure regulator used in the system of FIG. 1.

As shown in FIG. 2, the regulator 17 comprises a relief valve 21 connected to the booster line 16, an actuator 22 for selectively setting to a high or a low level the pressure at which the relief valve 21 opens, and a high pressure selector valve 23 for controlling the operation of the actuator 22 in response to the differential pressure between the two main hydraulic pressure lines 6 and 7.

In more detail, the regulator 17 comprises a first casing 24 connected in liquid tight relation to one side of a second casing 25. The first casing 24 encloses the relief valve 21 and the actuator 22, while the second casing 25 encloses the high pressure selector valve 23. The first casing 24 is provided at one end thereof with a port 26 connected to the booster line 16 and defines a bore 27 of a small inner diameter connected to the port 26, a bore 28 of a medium inner diameter connected to the small bore 27, and a bore 29 of a large inner diameter connected to the medium bore 28, with a port 31 formed in the wall of the casing 24 communicating the large bore 29 with a tank 30.

The relief valve 21 comprises a valve seat 32 formed on the inner end of the small bore 27, and a poppet 33 fitted in the medium bore 28 so as to be slidable along the axis m of the bore and urged against the valve seat 32 by a pressure regulating spring 34 enclosed in the large bore 27.

The actuator 22 comprises a fixed pipe 35 screwed to one side of the second casing 25 and extending axially inside the large bore 29 of the first casing 24 in axial alignment with the poppet 33, a fixed piston 36 formed on the free end of the pipe 35 integrally therewith, and a hollow cylindrical spring retainer 37 mounted on the fixed piston 36 so as to be axially slidable thereon. The spring retainer 37 is formed with an outer flange 37a.

The pressure regulating spring 34 is disposed between the poppet 33 and the flange 37a, and an actuator spring 38 is provided between the flange 37a and the lateral wall of the second valve casing 25. The inner circumferential surface of the bore of the spring retainer 37 and the axial end face of the fixed piston 36 define a pressure chamber 39 in the spring retainer 37. The pressure chamber 39 is connected through an axial fluid passage 41 formed in the fixed pipe 35 to an outlet port 42 of the previously mentioned high pressure selector valve 23.

The valve 23 comprises a pair of inlet ports 43 and 44 formed in the opposite ends of the second valve casing 25 and connected to the two main hydraulic pressure lines 6 and 7, respectively, a cylinder bore 45 and a bore 46 of an enlarged diameter both formed in the casing 25 in axial alignment and communication with each other, and a spool 47 enclosed in the cylinder bore 45 slidably along the axis n thereof and in fluid tight relation to the inner surface of the bore 45. The spool 47 is formed on the exterior surface thereof with a pair of annular grooves 48 and 49 and has one end portion 47a thereof disposed in the enlarged-diameter bore 46. The end portion 47a of the spool 47 is formed with a flange 51 and threaded at 52, with a cap nut 53 mounted on the threaded portion 52.

A spool retainer 54 is provided to retain the spool 47 at a neutral position so long as the difference between the hydraulic pressures acting on the opposite ends of the spool 47, that is, the differential pressure between the two main hydraulic pressure lines 6 and 7 connected to the inlet ports 43 and 44, respectively, remains within a predetermined range, for example, below 15 kg/cm². The spool retainer 54 comprises a pair of opposed end faces 55 and 56 defining the opposite ends of the enlargeddiameter bore 46 of the second valve casing 25, a pair of axially aligned members 57 and 58 disposed in the bore 46 between the end faces 55 and 56 so as to be movable individually, and a spring 59 arranged between the two movable members 57 and 58 to urge them away from each other in opposite directions into resilient abutment against the end faces 55 and 56, respectively.

The cap nut 53 screwed to the upper threaded end 52 of the spool 47 has an inner axial end face 61 while the flange 51 on the spool 47 has an axial end face 62 opposed to the end face 61 of the cap nut 53. The end faces 61 and 62 engage with the inner faces of the movable members 57 and 58, respectively, so that if the spool 47 is moved in either direction, it carries the corresponding one of the movable members 57 and 58 away from the corresponding one of the faces 55 and 56 of the bore 46.

The movable members 57 and 58 are shaped like a cup slidably mounted on the previously mentioned end portion 47a of the spool 47 and having a flange 57a, 58a, with the opposite ends of the spring 59 bearing on the opposed inner faces of the flanges 57a and 58a to urge the cups 57 and 58 in opposite directions so that the outer end faces of the flanges 57a and 58a of the cups abut against the corresponding end faces 55 and 56 of the largediameter bore 46 of the valve casing 25.

In addition to the previously mentioned outlet port 42 of the second valve casing 25 communicating with the first annular groove 48 of the spool 47, the casing 25 is further provided with a discharge port 63 communicating the second annular groove 49 with the tank 30 through the large-diameter bore 29 and the port 31 of the first valve casing 24, a recess 64 communicating the first and second annular grooves 48 and 49 only when the spool 47 is at the neutral position as shown in FIG. 2, a first switching port 65 communicating the first inlet port 43 with the first annular groove 48 when the spool 47 is moved to a lower position in FIG. 2, and a second switching port 66 communicating the second inlet port 44 with the first annular groove 48 when the spool 47 is moved to an upper position.

The system operates in the following manner:

While the vehicle is advancing, the pressure in the first main hydraulic pressure line 6 is high and the pressure in the second main hydraulic pressure line 7 is low.

Under the condition the difference between the hydraulic pressure introduced through the inlet port 43 and acting on the upper side of the spool 47 and the hydraulic pressure introduced through the inlet port 44 and acting on the under side of the spool 47 exceeds the pressure preset in the spool retainer 54. As a result, the differential pressure acting downwardly on the spool 47 overcomes the force of the spring 59 and causes the spool 47 and the member 57 thereon to move downwardly away from the end face 55. This shuts off the communication between the first and the second annular grooves 48 and 49 on the spool 47 and simultaneously establishes a communication between the first inlet port 43 and the first switching port 65, so that the high hydraulic pressure in the first main hydraulic pressure line 6 is introduced through the inlet port 43 and the switching port 65 into the first annular groove 48, from which the pressure is further led through the outlet port 42 into the pressure chamber 39 of the actuator 22 in the first valve casing 24 thereby to push the spring retainer 37 against the force of the actuator spring 38 back to a position or adjacent thereto where the retainer 37 abuts on the wall of the second valve casing 25. This causes the regulating spring 34 of the relief valve 21 to be kept relatively extended, so that the relief valve 21 operates in response to a low pressure level preset to, say, 5 kg/cm$^2$. This keeps the boost pressure applied through the booster line 16 to the main hydraulic pressure line 7 at the preset low level (5 kg/cm$^2$) thereby to prevent cavitation. Under the condition, the higher hydraulic pressure available in the other main hydraulic pressure line 6 is supplied through the pilot line 11 to the actuators 9 and 10 to operate them independently of the boost pressure.

Under the condition, if the pump 3 and the motor 5 are controlled so as to bring them into a neutral position, the hydraulic pressure in the first main hydraulic pressure line 6 is lowered down to, say, 20 kg/cm$^2$, so that the differential pressure between the two main hydraulic pressure lines 6 and 7 decreases to 15 kg/cm$^2$, whereupon the spool retainer 54 causes the spool 47 of the high pressure selector valve 23 to return to the neutral position, so that the spool 47 closes both the switching ports 65 and 66 and at the same time communicates the first and second annular grooves 48 and 49 through the recess 64, whereupon the pressure chamber 39 of the actuator 22 in the first valve casing 24 is connected to the tank port 31 through the outlet port 42, the annular grooves 48 and 49 and the discharge port 63, so that the spring retainer 37 returns to the position shown by solid lines in FIG. 2 where the force of the actuator spring 38 balances that of the pressure regulating spring 34. This causes the pressure regulating spring 34 to be compressed or shortened so that the pressure for opening the relief valve 21 is raised up to a preset higher level, say, 20 kg/cm$^2$. This means that in the driving range in which the transmission is controlled to the neutral position or adjacent thereto, that is, the range in which the differential pressure between the two main hydraulic pressure lines 6 and 7 is below 15 kg/cm$^2$, the boost pressure is raised up to 20 kg/cm$^2$ so that the system pressure is kept above 20 kg/cm$^2$ thereby to make it possible to operate the actuators 9 and 10 for controlling the displacement of the pump 3 and the motor 5 without any trouble or inconvenience.

Under the above-mentioned neutral condition, if the displacement of the pump and the motor is controlled in the negative direction so as to drive the vehicle rearward, the hydraulic pressure in the second main hydraulic pressure line 7 rises. When the differential pressure between the two main hydraulic pressure lines 6 and 7 exceeds 15 kg/cm$^2$, the difference between the pressures acting on the upper and under surfaces of the spool 47 again exceeds the preset pressure level of the spool retainer 54, so that the spool 47 overcomes the force of the spring 59 of the spool retainer 54 thereby to move the movable cup 58 upward away from the end face 56. This shuts off the communication between the first and second annular grooves 48 and 49 and simultaneously establishes a communication between the second inlet port 44 and the second switching port 66, so that the high hydraulic pressure in the second main hydraulic pressure line 7 is introduced into the first annular groove 48 through the second inlet port 44 and the second switching port 66.

The hydraulic pressure introduced into the first annular groove 48 is then led through the outlet port 42 to the pressure chamber 39 of the actuator 22 to bring the spring retainer 37 of the actuator into abutment on the wall of the second valve casing 25 or to a position adjacent thereto against the force of the actuator spring 38. This allows the pressure regulating spring 34 to be extended again so that the boost pressure supplied to the main hydraulic pressure line 6 at the low pressure side of the circuit is maintained at 5 kg/cm$^2$. In this case, since the high hydraulic pressure in the other main hydraulic pressure line 7 is supplied through the pilot line 11 to the actuators 9 and 10 for controlling the displacement of the pump and the motor, it is possible to operate the actuators independently of the boost pressure.

As described above, with the system of the invention it is possible to operate the actuators 9 and 11 for controlling the displacement of the pump 3 and the motor 5 at all times without providing any additional auxiliary pump. Moreover, since the boost pressure is maintained at the minimum essential level (say, 5 kg/cm$^2$) in other driving ranges than the range where the differential pressure between the two main hydraulic pressure lines 6 and 7 is below 15 kg/cm$^2$, the power consumption of the booster pump 13 is kept at a proper and reasonable level.

With the system of the invention, by properly selecting the pressure range in which the high pressure selector valve 23 remains inoperative, the force of the pressure regulating spring 34 of the relief valve 21 or that of the spring 38 of the actuator 22, the pressure receiving area of the pressure chamber 39 of the actuator 22 and other factors or conditions, it is possible to set the boost pressure to various levels and select different switching conditions thereby to apply the system of the invention to various hydraulic pressure circuits.

Figure 3:
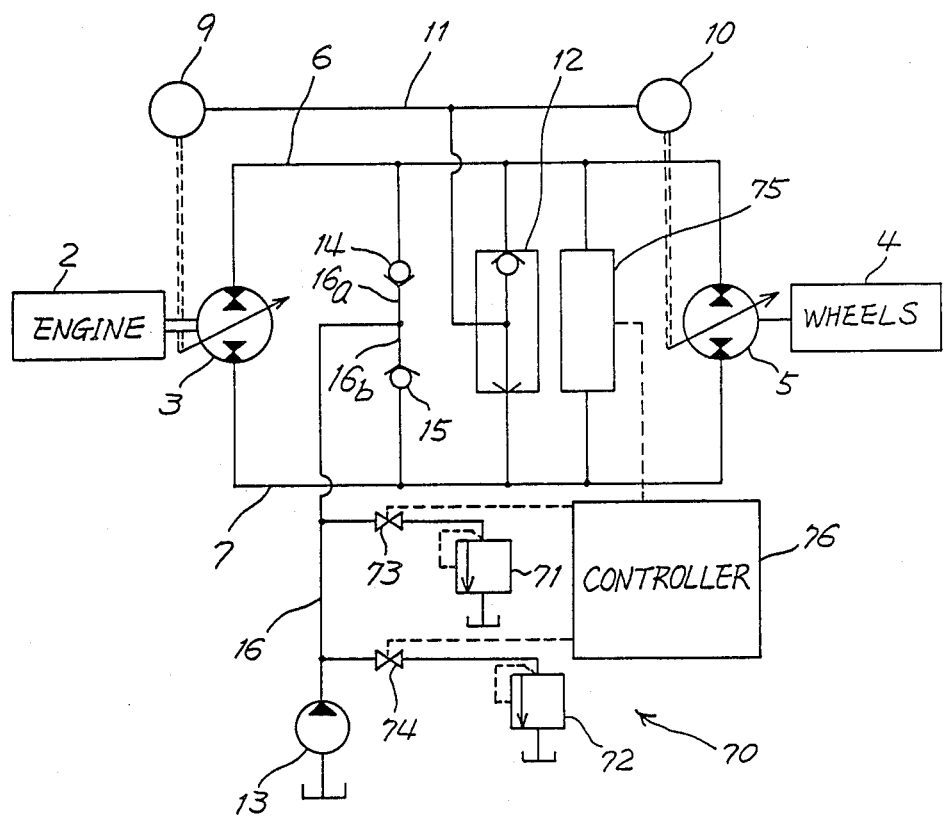
FIGS. 3 and 4 are schematic block diagrams of different embodiments of the invention.

The invention is not limited to the above-mentioned embodiment. A system shown in FIG. 3 can operate as effectively as the system shown in FIG. 1. In FIG. 3 the same reference symbols as in FIG. 1 designate corresponding component parts so that no explanation will be given to them.

The system of FIG. 3 employs a boost pressure regulator 70 of a different construction from the regulator 17 in FIG. 2. The regulator 70 comprises a high pressure relief valve 71 having a pressure for opening the valve preset to, say, 20 kg/cm$^2$, and a low pressure relief valve 72 having a pressure for opening the valve preset to, say, 5 kg/cm$^2$, the two relief valves being connected to the booster line 16 through valve 73 and 74, respectively. A differential pressure sensor 75 is connected between the two main hydraulic pressure lines 6 and 7. A controller 76 operates in response to the signal from the sensor 75 to selectively control the valves 73 and 74. In particular, if the differential pressure detected by the differential pressure sensor 75 is higher than a predetermined level, the controller 76 opens the valve 74 only so as to connect the low pressure relief valve 72 to the booster line 16. When the differential pressure is lowered below the predetermined level, the controller 76 opens the other valve 73 only so as to connect the high pressure relief valve 71 to the booster line 16.

Figure 4:
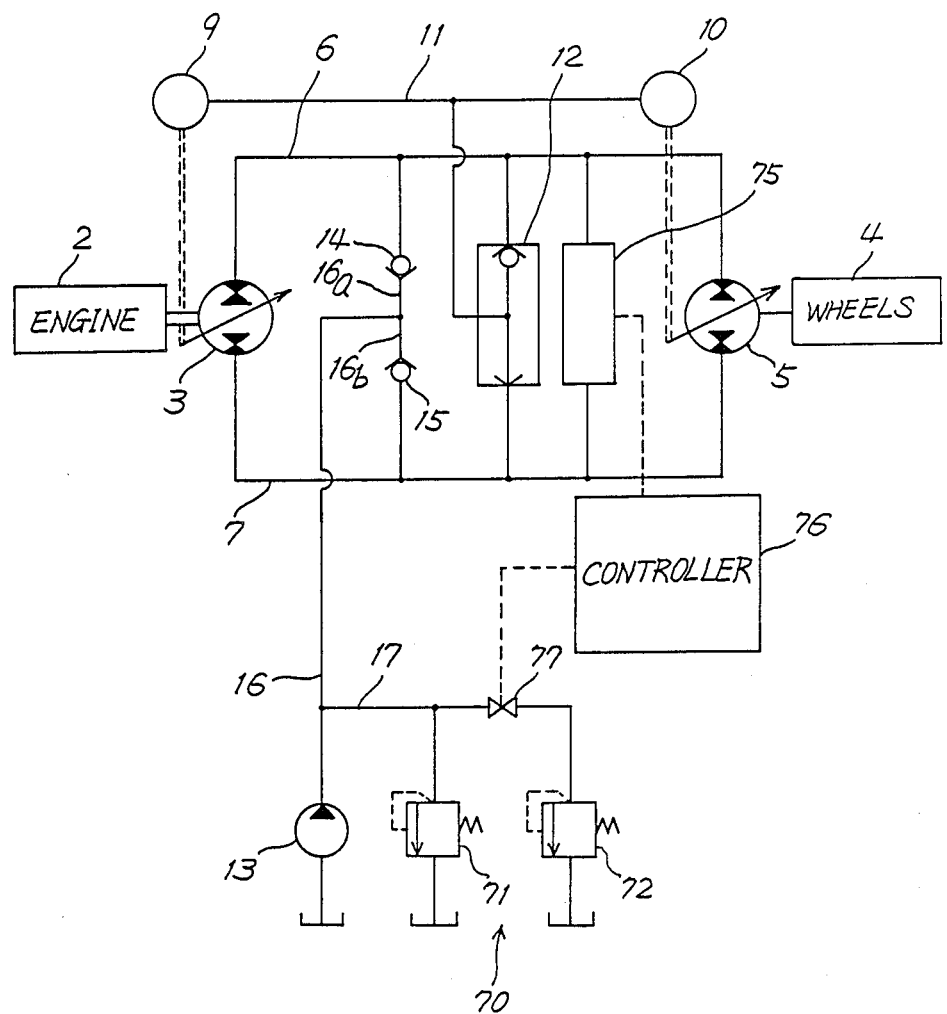

A modification of FIG. 3 is shown in FIG. 4, wherein a low pressure relief valve 72 is connected through a line 17 to the booster line 16, and a high pressure relief valve 71 is connected to the line 17, with a control valve 77 being connected in the line 17 between the two relief valves 71 and 72. The valve 77 is controlled by a controller 76 in the following manner. When the differential pressure detected by the sensor 75 exceeds a predetermined level, the controller 76 opens the control valve 77 to connect the lower pressure relief valve 72 to the booster line 16, with the high pressure relief valve 71 remaining inoperative. When the differential pressure becomes lower than the predetermined level, the controller 76 closes the control valve 77 so as to disconnect the low pressure relief valve 72 from the booster line 16, with the high pressure relief valve 71 becoming operative.

The operation of the systems of FIGS. 3 and 4 is similar to that of the system of FIG. 1, so that no explanation will be required.

Thus, with the system of the invention it is possible to operate at all times the actuators for controlling the variable displacement of the hydraulic pump and the hydraulic motor and performing other operations with the pressure available in the system only and without providing any additional auxiliary pump.

The system of the invention can advantageously avoid an unnecessarily large load being imposed on the booster pump to increase its power consumption.

What I claim is:

1. A hydraulic pressure system comprising:
   (a) a hydraulic pump;
   (b) an actuator for changing the displacement of said hydraulic pump;
   (c) a hydraulic motor;
   (d) a pair of main hydraulic pressure lines for connecting said hydraulic pump and said hydraulic motor to form a closed circuit;
   (e) a booster pump;
   (f) a booster line for supplying a hydraulic pressure from said booster pump to the low pressure side of said closed circuit;
   (g) a pilot line for taking out a pilot hydraulic from the high pressure side of said closed circuit to operate said actuator with said pilot hydraulic pressure; and
   (h) a boost pressure regulator for causing the hydraulic pressure in said booster line to rise to a predetermined level only when the differential pressure between said pair of main hydraulic pressure lines becomes lower than a predetermined level, said boost pressure regulator including:
   (1) a first relief valve connected through a first control valve to said booster line and adapted to be opened by a predetermined high hydraulic pressure level;
   (2) a second relief valve connected through a second control valve to said booster line and adapted to be opened by a predetermined low hydraulic pressure level;
   (3) a differential pressure sensor for sensing the differential pressure between said pair of main hydraulic pressure lines to produce a first signal when said differential pressure is higher than a predetermined level and a second signal when said differential pressure is lower than said predetermined level; and
   (4) a controller operable in response to said first signal to open said second control valve only and in response to said second signal to open said first control valve only.

2. The system of claim 1, wherein said hydraulic pump is driven by an engine and said hydraulic motor drives the wheels of a vehicle.

3. The system of claim 1, further including a second actuator for changing the displacement of said hydraulic motor, said pilot pressure also operating said second actuator.

4. A hydraulic pressure system comprising:
   (a) a hydraulic pump;
   (b) an actuator for changing the displacement of said hydraulic pump;
   (c) a hydraulic motor;
   (d) a pair of main hydraulic pressure lines for connecting said hydraulic pump and said hydraulic motor to form a closed circuit;
   (e) a booster pump;
   (f) a booster line for supplying a hydraulic pressure from said booster pump to the low pressure side of said closed circuit;
   (g) a pilot line for taking out a pilot hydraulic from the high pressure side of said closed circuit to operate said actuator with said pilot hydraulic pressure; and
   (h) a boost pressure regulator for causing the hydraulic pressure in said booster line to rise to a predetermined level only when the differential pressure between said pair of main hydraulic pressure lines becomes lower than a predetermined level, said boost pressure regulator including:
   (1) a first relief valve adapted to be opened by a predetermined high hydraulic pressure level;
   (2) a second relief valve adapted to be opened by a predetermined low pressure level;
   (3) a line connecting said second relief valve to said booster line, with said first relief valve connected to said connecting line between said booster line and said second relief valve;
   (4) a control valve being connected in said connecting line between said first and second relief valves;
   (5) a differential pressure sensor for sensing the differential pressure between said pair of main hydraulic pressure lines to produce a first signal when said differential pressure is higher than a predetermined level and a second signal when said differential pressure is lower than said predetermined level; and
   (6) a controller operable in response to said first signal and in response to said second signal to close said control valve.

* * * * *